United States Patent [19]

Chamberlain et al.

[11] 4,058,189
[45] Nov. 15, 1977

[54] CONTROL LINKAGE FOR A BAND TYPE BRAKE

[75] Inventors: Monte Chamberlain, Metamora; Glen S. Comer, Jr., Dunlap; Fredrick H. Elliott, Bartonville, all of Ill.

[73] Assignee: Caterpillar Tractor Co., Peoria, Ill.

[21] Appl. No.: 665,732

[22] Filed: Mar. 11, 1976

[51] Int. Cl.² .......................................... F16D 49/10
[52] U.S. Cl. .................. 188/77 R; 188/250 F; 192/80
[58] Field of Search ............... 188/77 R, 250 F; 192/79, 80

[56] References Cited

U.S. PATENT DOCUMENTS

| | | | |
|---|---|---|---|
| 2,087,382 | 7/1937 | LaBrie et al. | 188/250 F |
| 2,213,361 | 9/1940 | Cardwell | 192/80 |
| 2,678,703 | 5/1954 | Williams et al. | 188/77 R |
| 2,854,858 | 10/1958 | Butterfield et al. | 188/77 R |
| 3,034,600 | 5/1962 | Berno | 188/77 R |
| 3,473,632 | 10/1969 | Kimura et al. | 192/80 |
| 3,863,738 | 2/1975 | Molloy | 188/77 R |

Primary Examiner—Trygve M. Blix
Assistant Examiner—Edward R. Kazenske
Attorney, Agent, or Firm—Wegner, Stellman, McCord, Wiles & Wood

[57] ABSTRACT

A control linkage for a band-type brake having an actuating lever provided with a pair of anchor pins, a brake band adapted to be trained about a rotary element to be braked in either direction of its rotation, the band having one end connected to one of the anchor pins, an adjustment bracket connected to the other of the pins, and the other end of the band being connected to the adjustment bracket, and an anchor bracket having upwardly and downwardly opening slots loosely receiving the pins with the pin connected to the adjustment bracket being disposed in the downwardly open slot. A spring resiliently biases the pin in a downwardly open slot upwardly into engagement with the bottom of its associated slot to provide smooth braking action.

1 Claim, 2 Drawing Figures

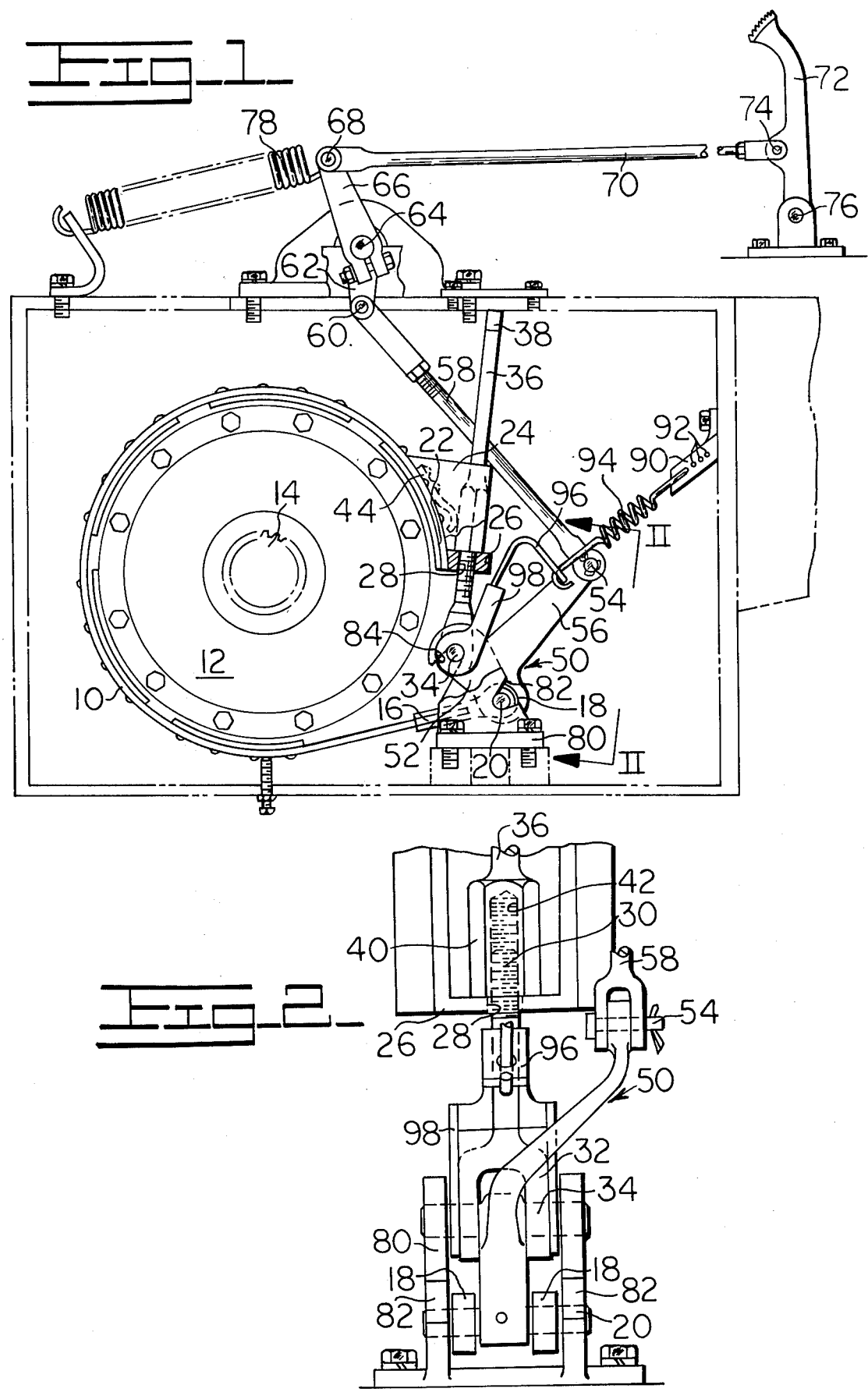

CONTROL LINKAGE FOR A BAND TYPE BRAKE

BACKGROUND OF THE INVENTION

This invention relates to control linkages for band type brakes and, more particularly, to improvements whereby smooth braking action is obtained in such linkages.

Prior art of possible relevance includes U.S. Pat. No. 2,854,858 issued Oct. 7, 1958 to Butterfield et al.

In brake systems employing brake bands, particularly those employed in, for example, crawler type vehicles employing steering clutches, unfailing smooth braking action has often been an elusive quality. The fact that the direction of rotation of the element to be braked is frequently changed, coupled with wear of brake elements and/or improper adjustment can result in slackness occurring in the control linkage and/or braking components which is not conducive to smooth braking action.

SUMMARY OF THE INVENTION

It is the principal object of the invention to provide a new and improved control linkage for a band-type brake. More specifically, it is an object of the invention to provide such a control linkage wherein smooth braking is attainable notwithstanding wear and/or adjustment difficulties.

An exemplary embodiment of the invention achieves the foregoing object in a control linkage having an actuating lever provided with a pair of anchor pins. A brake band is adapted to be trained about the rotary element to be braked in either direction of rotation and has its opposite ends connected to respective ones of the anchor pins. An anchor bracket has oppositely opening slots, each loosely receiving a respective one of the pins. Means are provided for resiliently biasing one of the pins into engagement with the bottom of its associated slot so as to preclude relative motion between the slot and the pin during the initial phases of a braking action which could cause rough braking. Accordingly, smooth braking is facilitated.

In a preferred embodiment, the slots open upwardly and downwardly and the biased one of the pins is that received in the downwardly opening slot.

Preferably, the resilient means comprise a spring which may extend to the side of the pin and the spring is connected to the pin by a link configured to maximize the vertical component of the biasing force applied to the pin.

In a highly preferred embodiment, the acutating lever is in the form of an inverted T and has an actuating link connected to its upper end. A further spring is connected to the actuating linkage and serves to bias both pins into engagement with the bottoms of both slots.

Other objects and advantages will become apparent from the following specification taken in connection with the accompanying drawings.

DESCRIPTION OF THE DRAWINGS

FIG. 1 is a side elevation of a braking linkage made according to the invention; and FIG. 2 is an enlarged, fragmentary view taken approximately along the line 2—2 of FIG. 1.

DESCRIPTION OF THE PREFERRED EMBODIMENT

An exemplary embodiment of a control linkage for a band type brake made according to the invention is illustrated in FIGS. 1 and 2 and is particularly suited for use in vehicles employing steering clutches as, for example, crawler type tractors. However, it is to be understood that use of the invention is not limited to such vehicles.

As seen in FIG. 1, a brake band 10 is trained about a rotary element 12 to be braked, which element is disposed on a shaft 14. Typically, the element 12 will be a steering clutch and, of course, the shaft 14 will undergo bidirectional rotation. One end 16 of the brake band 10 terminates in a bifurcated yoke 18 (FIG. 2) impaled on an anchor pin 20. The other end 22 of the brake band 10 is connected to an adjustment bracket 24. The adjustment bracket 24 carries a plate 26 having a bore 28 through which a threaded shaft 30 loosely extends. The shaft 30 is connected to a bifurcated yoke 32 also having its arms impaled by an anchor pin 34.

An adjustment rod 36 having a handle 38 at its upper end and a hexagonal formation 40 at its lower end includes a threaded bore 42 in the hexagonal end 40 threadably receiving the shaft 30 above the plate 26. Consequently, by appropriately rotating the shaft 36, the effective length of the band 10, that is, the peripheral distance between the anchor pins 20 and 34 can be varied as desired.

The assemblage also includes a leaf spring 44 which bears against the hexagonal end 40 to maintain the shaft 36 in any desired position of rotary adjustment relative to the plate 26.

The control linkage includes an actuating lever 50 in the form of an inverted T. The anchor pins 20 and 34 are connected to the actuating lever on opposite ends of the cross bar 52, while a pivot 54 is provided at the upper end of the arm 56 of the actuating lever 50. A link 58 is connected to the pivot 54 and is pivotally connected at 60 to an arm 62 secured to a rotary shaft 64.

The shaft 64 mounts a further arm 66 which is pivotally connected at 68 to a link 70 extending to an actuating pedal 72 or the like. The pedal 72 is pivotally connected to the link 70 by a pivot pin 74 and to a stationary element such as the floor of the vehicle cab by a pivot pin 76.

A tension spring 78 is connected to the arm 66 to bias the same in a counterclockwise direction with the consequence that the link 58 is urged downwardly and the actuating lever 50 urged in a clockwise direction.

A bifurcated anchor bracket 80 is secured by any suitable means to the vehicle frame and each arm thereof includes oppositely directed, aligned slots. As seen in FIG. 1, generally upwardly opening slots 82 receive the anchor pin 20 while generally downwardly open slots 84 receive the anchor pin 34. Depending upon the direction of rotation of the rotary element 12 when braking force is applied via operation of the pedals 72, the bottom of one or the other of the slots 82 or 84 serves as the pivot point for the actuating lever 50. The resulting pivoting of the actuating lever 50 about one or the other of the points tightens the band about the rotary element 12 to apply braking force thereto generally in the manner described in the previously identified Butterfield et al patent.

As will be apparent to those skilled in the art, the weight of the adjustment bracket 24 as well as wear in the brake band 10 will tend to cause the anchor pin 34 to move downwardly out of its slot 84. The resulting slack in the linkage, that is, the amount of movement required before the anchor pin 34 seats against the bottom of the groove 84 is not conducive to smooth braking action.

To provide for smooth braking action, the invention contemplates that the anchor pin 34 be continuously biased upwardly into engagement with the bottom of its associated groove 84. To this end, a stationary bracket 90 is secured by any suitable means to the vehicle frame and may be provided with a series of apertures 92 for selective receipt of the end of a tension spring 94. The spring 94 is connected to the anchor pin 34 to bias the same upwardly as mentioned via a link 96 terminating in a bifurcated yoke 98 impaled by the pin 34.

As can be seen in FIG. 1, the spring 94 extends upwardly and to the side of the anchor pin 34. In order to maximize the vertical component of the biasing force applied to the anchor pin 34, the link 96 is bent as illustrated. The resulting biasing force assures that the pin 34 will always be positively seated within its groove 84. At the same time, the weight of the actuating lever 50 as well as the bias in a clockwise direction applied thereto from the spring 78, will cause the pin 18 to seat in its groove 82.

As a consequence, there is no lost motion during the initial phases of a braking operation regardless of the direction of rotation of the rotary element 12 so that smooth braking will always occur.

Additionally, it should be noted that spring 94 affords only sufficient supplemental force to counteract the affect of gravity on the linkage mass.

We claim:

1. In a control linkage for a band type brake having an acutating lever provided with a pair of anchor pins, a brake band adapted to be trained about a rotary element to be braked in either direction of rotation and having one end connected to one of said anchor pins, an adjustment bracket connected to the other of said pins, the other end of said band being connected to said adjustment bracket, an anchor bracket having a pair of spaced slots loosely receiving said pins and means for biasing one of said pins towards an end of the slot in which it is received, the improvement comprising additional means resiliently biasing the other pin into engagement with the end of its associated slot and oppositely of said one pin; one of said slots opening generally upwardly and having a lower end and the other of said slots opening generally downwardly and having an upper end, said one pin being received in said upwardly opening slot and said other pin being received in said downwardly open slot, said biasing means biasing said one pin toward said lower end and said additional means biasing said other pin toward said upper end, said additional means applying a predominantly vertical force to said other pin; said additional means comprising a spring and a separate, bent link directly interconnecting said spring and said other pin.

* * * * *